US011552899B2

(12) United States Patent
Kling et al.

(10) Patent No.: US 11,552,899 B2
(45) Date of Patent: Jan. 10, 2023

(54) AUTOMATIC SCALING FOR CONSUMER SERVERS IN A DATA PROCESSING SYSTEM

(71) Applicant: MICROSOFT TECHNOLOGY LICENSING, LLC, Redmond, WA (US)

(72) Inventors: Daniel Veiga Kling, Redmond, WA (US); Vidhyashankar Balasubramaniyan, Redmond, WA (US); Sana Rajeev Nagar, Yarrow Point, WA (US); Stalinbabu Chennupati, Bellevue, WA (US); Yuemei Zhang, Beijing (CN); Jason Lawrence Muramoto, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/320,136

(22) Filed: May 13, 2021

(65) Prior Publication Data
US 2022/0368647 A1 Nov. 17, 2022

(51) Int. Cl.
*H04L 47/762* (2022.01)
*H04L 47/78* (2022.01)
(Continued)

(52) U.S. Cl.
CPC .......... *H04L 47/762* (2013.01); *H04L 47/129* (2022.05); *H04L 47/781* (2013.01);
(Continued)

(58) Field of Classification Search
None
See application file for complete search history.

(56) References Cited

U.S. PATENT DOCUMENTS 10,348,858 B2 7/2019 Theebaprakasam et al.
10,469,396 B2 11/2019 Mellor et al.
(Continued)

FOREIGN PATENT DOCUMENTS

WO 2017200878 A1 11/2017

OTHER PUBLICATIONS

S. Heinzl, C. Metz, Toward a Cloud-ready Dynamic Load Balancer based on the Apache Web Server, pp. 342-345 (Year: 2013).*
(Continued)

*Primary Examiner* — Christopher M Crutchfield
(74) *Attorney, Agent, or Firm* — NovoTechIP International PLLC

(57) ABSTRACT

A system and method for automatically scaling consumer servers in a data processing system. To build an automatic scaling system, the present disclosure allows consumers to obtain additional information, e.g., the number of events that await to be read from an aggregator when receiving an event from the aggregator. This additionally obtained number provides a direct gauge for the data processing system to determine when the consumers are over-provisioned, i.e., when the number of events left to be read is close to zero, as well as when the consumers are under-provisioned, e.g., when the number of events left to be read continues to increase. As a result, the consumers can be automatically scaled to handle the dynamic data processing demand while providing optimal resource allocation.

18 Claims, 8 Drawing Sheets

(51) Int. Cl.
*H04L 67/1012* (2022.01)
*H04L 47/80* (2022.01)
*H04L 47/129* (2022.01)

(52) U.S. Cl.
CPC .......... *H04L 47/801* (2013.01); *H04L 47/805* (2013.01); *H04L 67/1012* (2013.01)

(56) References Cited

U.S. PATENT DOCUMENTS

| | | | |
|---|---|---|---|
| 10,659,289 B2 | 5/2020 | Shif et al. | |
| 2008/0049616 A1* | 2/2008 | Kamath | H04L 67/1012 370/235 |
| 2012/0110159 A1* | 5/2012 | Richardson | H04L 67/1001 709/223 |
| 2016/0080484 A1* | 3/2016 | Earl | H04L 67/1008 709/226 |
| 2016/0188376 A1 | 6/2016 | Rosas et al. | |
| 2019/0014171 A1 | 1/2019 | Stein et al. | |
| 2019/0268278 A1* | 8/2019 | Kaitha | H04L 41/147 |
| 2020/0314177 A1* | 10/2020 | Kipp | H04L 9/14 |
| 2021/0026700 A1* | 1/2021 | Manickam | G06F 9/5055 |
| 2021/0081256 A1 | 3/2021 | Sathyanaraya et al. | |
| 2021/0099517 A1* | 4/2021 | Friedrich | G06N 20/00 |

OTHER PUBLICATIONS

Kumaresan, Arunkumar, "Understanding the consumer side of Azure Event Hubs (Checkpoint, InitialOffsetProvider, EventProcessorHost)", Retrieved from: https://www.serverless360.com/blog/understanding-consumer-side-of-azure-event-hubs-checkpoint-initialoffset-eventprocessorhost, Mar. 1, 2021, 11 Pages.

Zhang, et al., "Optimal Load Balancing in Publish/Subscribe Broker Networks Using Active Workload Management", In IEEE International Conference on Communications, May 19, 2008, 6 pages.

"International Search Report and Written Opinion Issued in PCT Application No. PCT/US22/024169", dated Jun. 27, 2022, 12 Pages.

* cited by examiner

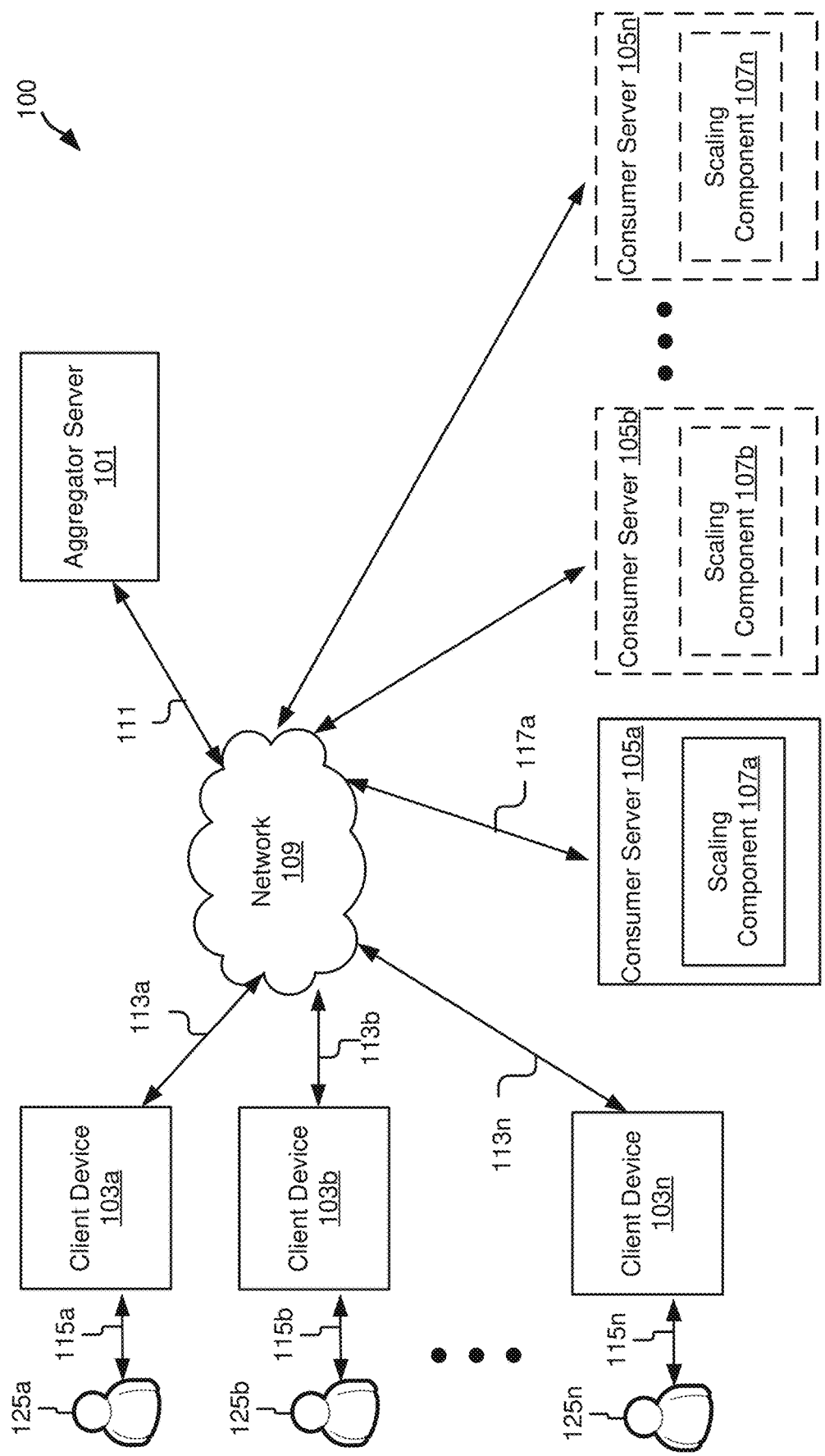

AUTOMATIC SCALING FOR CONSUMER SERVERS IN A DATA PROCESSING SYSTEM

BACKGROUND

A near-real-time (NRT) system can process and analyze data sent from clients, as the data arrives. NRT systems are built to process massive amounts of data with high throughput. For example, the NRT system can be used for telemetry gathering and monitoring the health and operation of a piece of software/hardware, by collecting, processing, and analyzing the telemetry data. Instead of waiting until all the data is collected to start data processing, the NRT system can respond to the data in near real time, i.e., making the received data available instantly apart from the event processing time.

One common data processing framework for exchanging and processing data in an NRT system is an aggregator and consumer pattern. In the aggregator and consumer pattern, clients or event producers that generate data or events transmit the produced data to an intermediate middleware, i.e., an aggregator, rather than transmitting the data directly to a consumer that consumes or processes the data. To effectively process large volumes of data received from clients, the aggregator side may be scaled, e.g., by adding or removing one or more aggregators, based on metrics that are monitored and measured in the aggregator such as the number of connections and data throughput. However, the consumer cannot track and leverage these metrics and thus may not be able to accommodate the data processing demands of the aggregator, thus leading to unnecessarily heavy processing load for the aggregator and inducing latency in the data processing flow. When the aggregator is overloaded due to the slow data processing by the consumer, the aggregator may drop the received event or data without forwarding it to the consumer for processing. When latency is introduced, the NRT system may become unreliable for processing data in near real time. As a result, in a high-throughput environment, the consumer may become a bottleneck that limits the throughput and detrimentally affects the performance of the NRT system.

Moreover, even if the consumer can obtain the number of connections and data throughput, constant monitoring of these metrics and rebalancing of the NRT system are required to reflect the dynamic data processing status. However, such an approach is error-prone and may result in under-provisioning or over-provisioning on the consumer side.

Hence, there is a need for an efficient approach of automatically scaling consumer(s) to balance data transmission and to achieve fast data processing.

SUMMARY

In one aspect, a data processing system for automatically scaling consumer servers includes a processor, and a memory, coupled to the processor, storing executable instructions. The instructions, when executed by the processor, cause the data processing system to establish, by a first consumer server, a communication connection with an aggregator server to receive one or more events from the aggregator server, wherein the first consumer server is one of one or more consumer servers, and the aggregator server sends a plurality of events including the one or more events to the one or more consumer servers for processing; receive, at the first consumer server, a first event associated with a first number of events available on the aggregator server; determine whether to adjust a number of the one or more consumer servers based on the first number of events available on the aggregator server; and in response to determining to adjust the number of the one or more consumer servers based on the first number of events available on the aggregator server, adjust the number of the one or more consumer servers and allow the adjusted number of the one or more consumer servers to be allocated in the data processing system.

The above general aspect may include one or more of the following features: in response to determining not to adjust the number of the one or more consumer servers based on the first number of events available on the aggregator server: receiving, at the first consumer server, a second event associated with a second number of events available on the aggregator server, wherein the second number is different from the first number, and determining whether to adjust the number of the one or more consumer servers based on the second number of events available on the aggregator server; determining processing capability of the first consumer server when receiving the first event, the processing capability including a quantity of events that the first consumer server can process within a unit of time, creating a queue of events based on the processing capability and the first number of events available on the aggregator server, determining whether a quantity of events in the created queue satisfies a threshold number, and wherein determine whether to adjust the number of the one or more consumer servers is based on whether the quantity of events in the created queue satisfies the threshold number; determining that the quantity of events in the created queue fails to satisfy the threshold number for at least a threshold amount of time, and removing at least one of the one or more consumer servers based on determining that the quantity of events in the created queue fails to satisfy the threshold number for at least the threshold amount of time; specifying the threshold number based on a buffer size of the aggregator server; sharing the queue with other servers of the one or more consumer servers; subscribing, by the first consumer server, to the aggregator server to receive the one or more events; providing, by the aggregator server, an application programming interface (API), calling, by the first consumer server, the API to register the first consumer server, and creating, by the first consumer server, a call back to receive the one or more events using the API; receiving, by the aggregator server the plurality of events from a plurality of client devices.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1A and 1B are block diagrams of an example data/event processing system.

DETAILED DESCRIPTION

Figure 1B:
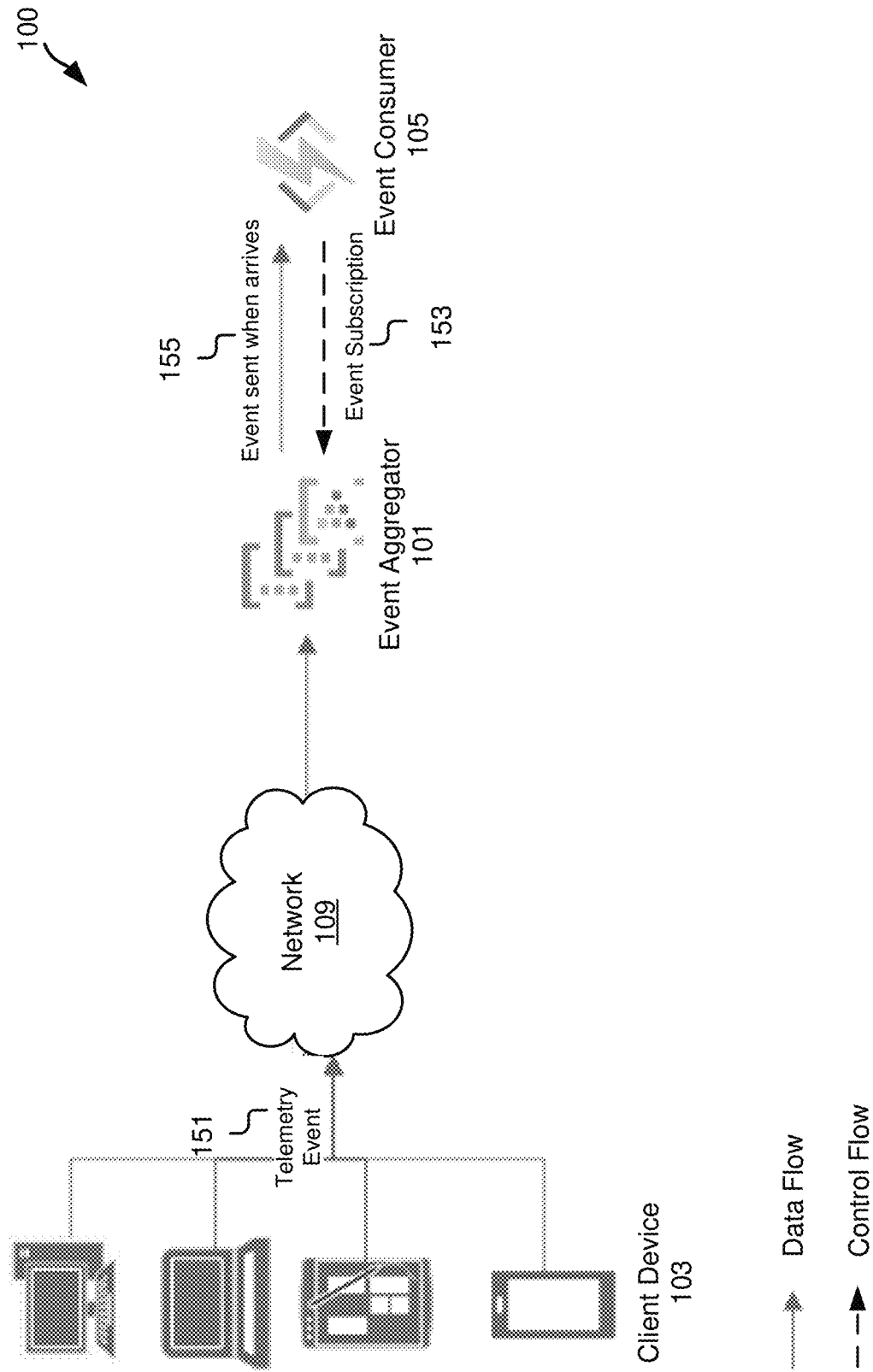

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high level, without detail, in order to avoid unnecessarily obscuring aspects of the present teachings.

An NRT system may process data received from client devices based on an aggregator and consumer framework. In such a framework, the received data may describe an event or action performed by a user accessing a client device. An aggregator may be responsible for receiving different types of data from different client devices which may be located in a variety of places and for transmitting data requested by a consumer, e.g., specific type(s) of data. The consumer may process and consume the received data. To handle a large volume of data, the NRT system may deploy a certain number of machines or servers on the aggregator and/or consumer side. Based on the context and for clarification reasons, in the description below, an aggregator may be referred to as an aggregator server or an event aggregator, while a consumer may be referred to as a consumer server or an event consumer.

One mechanism for deploying servers in an NRT system is to assign a fixed number of servers to the aggregator and/or consumer. However, this can lead to problems in the system as the amount of data from the clients, i.e., data traffic, is unpredictable. Therefore, the aggregator servers and/or the consumer servers need to be dynamically allocated to improve the performance of the NRT system.

When an aggregator receives data from client devices, the aggregator may be able to track and measure the number of connections, data throughput, and the like, and use these metrics to determine the number of servers needed on the aggregator side. For example, the aggregator can determine whether and how many servers can be added or removed. However, the consumer merely requests and receives data from the aggregator, and thus is blind to the system and network usage such as CPU, memory, and network traffic. Without performing a direct measurement when the NRT system is performing at full capacity (e.g., whether data/events are not being read from the aggregator), server deployment of a consumer may not be optimized. For example, the consumer cannot determine whether a new server is needed, how many new server(s) should be added, or whether an existing server can be removed. In the absence of effective resources (e.g., appropriate number of servers) on the consumer side, the consumer may not be able to accommodate the data processing needs of the aggregator. For example, if an aggregator processes the data at 100 events every second and a consumer processes the data at 10 events every second and only one consumer server is used to handle the data transmitted by the aggregator, this single consumer is unable to timely process the events. Without receiving acknowledgments that 100 events are being processed, the aggregator may leave the unprocessed events in its buffer until the buffer overflows. As a result of the overflow, the aggregator may discard the unprocessed events, thereby impairing the performance of data processing. Therefore, the consumer needs to be automatically scaled to meet the data processing demands of the aggregator.

Additionally, static metrics of CPU, memory, or network traffic may not reflect the dynamic status of data processing in the aggregator, for example, when data loss starts to occur in the aggregator. Even if server allocation in the consumer depends on performance metrics, constant monitoring and rebalancing of the system would be required to measure the metrics. This is error-prone and may lead to under-provisioning or over-provisioning of the consumer.

Thus, there exists a technical problem of the consumer becoming a bottleneck in an NRT system when the aggregator and consumer each manage the data flow and allocate resources or servers independently. This bottleneck may result in the aggregator being overloaded and data being abandoned without processing, thus causing significant deterioration of data processing system performance. Moreover, there exists another technical problem of over-provisioning of consumers, where the aggregator provides less data than the consumer is able to process, thus resulting in unnecessary allocation computer resources. The present disclosure provides the technical advantage of providing a system that allows aggregators to work in concert with consumers to automatically scale consumer servers by balancing the data loads among the aggregators and the consumers, and as such accommodating the data processing needs of the aggregators.

To build an automatic-scaling system, the technical solution described herein allows the consumers to obtain additional information, such as the number of events that await to be read from the aggregator, when receiving an event from the aggregator. This additionally obtained number provides a direct gauge for the system to determine when the consumer(s) is over-provisioned, i.e., when the number of events left to be read is close to zero, as well as when the consumer(s) is under-provisioned, i.e., when the number of events left to be read continues to increase. As a result, the consumers can be automatically scaled to handle the data processing demand while providing optimal resource allocation.

In one implementation, the aggregator may send additional information along with the events. For example, the aggregator may send a current event associated with a sequential number or event stamp, as well as the number of the events available for reading at the time the current event is being sent. Responsive to receiving the information, a consumer can calculate how far the data processing of the consumer has fallen behind or outpaced the data processing of the aggregator based on the information. As a result, the consumer can be scaled up or down to adapt to the actual data processing need.

FIG. 1A is a block diagram of an example data/event processing system 100. As shown, the system 100 includes an aggregator server 101, one or more client devices 103a-103n, and one or more consumer servers 105a-105n, coupled for electronic communication via a network 109. It should be understood that the system 100 depicted in FIG. 1 is provided by way of example and the system 100 and/or further systems contemplated by this disclosure may include additional and/or fewer components, may combine components and/or divide one or more of the components into additional components, etc. For example, the system 100 may include any number of client devices 103a-103n, aggregator servers 101, consumer servers 105, or networks 109.

The network 109 may be a conventional type, wired and/or wireless, and may have numerous different configurations including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In one implementation, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103a-103n (or collectively client device 103) may include virtual or physical computer processors, memor(ies), communication interface(s)/device(s), etc., which, along with other components of the client device 103, are coupled to the network 109 via signal lines 113a-113n for communication with other entities of the system 100. For example, the client device 103a-103n, accessed by users 125a-125n via signal lines 115a-115n respectively, may send and receive data to and from other client device(s) 103 and/or the aggregator server 101. Non-limiting examples of a client device 103 may include a laptop computer, a desktop computer, a tablet computer, a mobile telephone, a personal digital assistant (PDA), a mobile email device, or any other electronic device capable of processing information and accessing the network 109.

In one implementation, the client device 103 is a data source that generates data to be processed by other entities of the system 100. In one implementation, the data may describe a telemetry event that occurs in an application. The telemetry event may include a user interaction with the application such as the user 125a logging into Microsoft Word®, user 125b sending an email via Microsoft Outlook®, or user 125n leaving a Microsoft Teams® meeting, etc. The telemetry event may also be an application life cycle event such as an application initialization event or configuration update event. In another implementation, the data may also describe other types of events such as social network events, network connection events, events triggered by various types of sensors, etc. Since the data generally refers to event data and event data is transmitted via the network 109 to be processed by the aggregator server 101 and consumer servers 105a-105n, the aggregator server 101 may also be referred to as event aggregator and the consumers server 105a-105n may be referred to as event consumers.

The aggregator server or event aggregator 101 may be a computing device that serves as an intermediate middleware to communicate with one or more client devices 103 and one or more consumer servers 105a-105n. In one implementation, the aggregator server 101 includes a service (e.g., event help service) responsible for receiving events from client devices 103 around the world, processing/reading the events in a scalable manner, and making the events available to one or more consumer servers for further processing. For example, the aggregator server or event aggregator 101 may be Microsoft Azure® Event Hubs, Google Cloud Pub/Sub®, Amazon Kinesis®, Apache Flink®, etc. In one implementation, the aggregator server 101 may receive various types of data from various types of source client devices 103, and transmit data requested by a consumer server to the corresponding consumer server. For example, the consumer server 105a may subscribe to receive certain types of data. A consumer server is expected to consume data as the data arrives. In another implementation, the aggregator server 101 forwards all the received event data to one or more consumer servers 105a-105n. The aggregator server 101 is communicatively coupled to the network 109 via signal line 111.

In one implementation, the aggregator server 101 may be built with a short-term cache. The aggregator server 101 may keep or store the event data received from the client devices 103 for as long as that short-term cache is available. If the consumer server(s) is unable to process the data provided by the aggregator server 101 within the short time period determined by the cache, the aggregator server 101 would discard some data without forwarding the data to the consumer server 105a-105n.

In one implementation, the event aggregator 101 may provide specific APIs to allow the events to be read in real time. When an event consumer (e.g., consumer server 105a) actively subscribes to receive events provided by the aggregator server 101, the aggregator would send the events that have not yet been read to the event consumer. When the consumer server 105a-105n cannot catch up with the processing speed of the aggregator server 101, the aggregator server 101 may allow the data that is not read to be discarded or lost. In one implementation, the specific APIs provided by the event aggregator 101 support checkpointing. By checkpointing, the event aggregator 101 may track data reading status, for example, identifying the latest event data that is read, and synchronize the data exchange among the aggregator server 101 and one or more consumer servers 105a-105n. The data exchange flow will be described below in detail with reference to FIGS. 3-5.

The consumer server/event consumer 105a-105n (or collectively consumer server 105) may be a computing device that communicates with the aggregator server 101 to receive the event data. The consumer server 105a-105n processes and consumes the received data. For example, the consumer server 105a may categorize the received data, prioritize the received data, store the received data in a data store (not shown), etc. In one implementation, when the event data is forwarded to an event consumer, a process or service may be instantiated to process the received event data. Due to the heavy load of events, the process or service is generally hosted on a server, i.e., the consumer server 105a-105n, to process the events at a large scale.

The technical problem addressed by the technical solution described includes autoscaling of the consumer server 105a-105n when an existing allocation of consumer server(s) no longer accommodates the data processing needs of the aggregator server 101. The autoscaling includes two aspects.

On one hand, if the aggregator server 101 receives data from the client devices 103 faster than the existing number of consumer server(s) in the system 100 can handle, more consumer server(s) should be added. On the other hand, if the existing number of consumer server(s) processes the events provided by the aggregator server 101 faster than the aggregator server 101 receives the data from the client devices 103, one or more consumer server(s) should be removed. In the illustrated implementation, each of the consumer servers 105a-105n respectively includes a scaling component 107a-107n to perform the autoscaling functionalities as described herein. The scaling component 107a-107n or collectively scaling component 107 will be described in detail below with reference to FIG. 2.

In FIG. 1A, the consumer servers 105b-105n are depicted in dashed boxes to indicate that these consumer servers may be the second, third . . . $n^{th}$ consumer servers that are dynamically added or removed in addition to the first consumer server 105a. The first consumer server 125a is communicatively coupled to the network 109 via signal line 117a to exchange data with the aggregator server 101. The existing number of consumer servers 105b-105n used in the system 100 may be adjusted during the data processing depending on the demand of data processing. It should also be noted that the number of the aggregate server(s) 101 may also be scaled during the event/data processing. However, this scaling is not discussed in the present disclosure and thus only one aggregate server 101 is depicted for purposes of clarity and brevity. The autoscaling of the consumer server(s) 105a-105n will be described in more detail below with reference to FIGS. 2-5.

FIG. 1B is a block diagram of an example data/event processing system 100 shown in an alternative way. FIG. 1B illustrates the relationships, and data and control flows between different entities of the system 100. As depicted, the client devices 103 may send a telemetry event 151 via the network 109 to the event aggregator 101. The event consumer 105 may request the event data from the event aggregator 101 through event subscription 153. Responsive to receiving the telemetry event 151 from the client device 103, the event aggregator 101 may send the telemetry event 151 to the event consumer 105 for further processing in 155. The event aggregator 101 continues to forward the telemetry events 151 to the event consumer 105 in 155 when the event aggregator 101 receives such events from the client devices 103. As the amount of the telemetry events 151 transmitted in 155 grows, there may be an under-provision or overprovision issue on the consumer side, if the event processing speed in the event consumer 105 is slower or faster than the event transmitting speed from the event aggregator 101. In such a situation, one or more event consumer 105 needs to be added or removed on the consumer side to achieve automatic and dynamic scaling.

Figure 2:
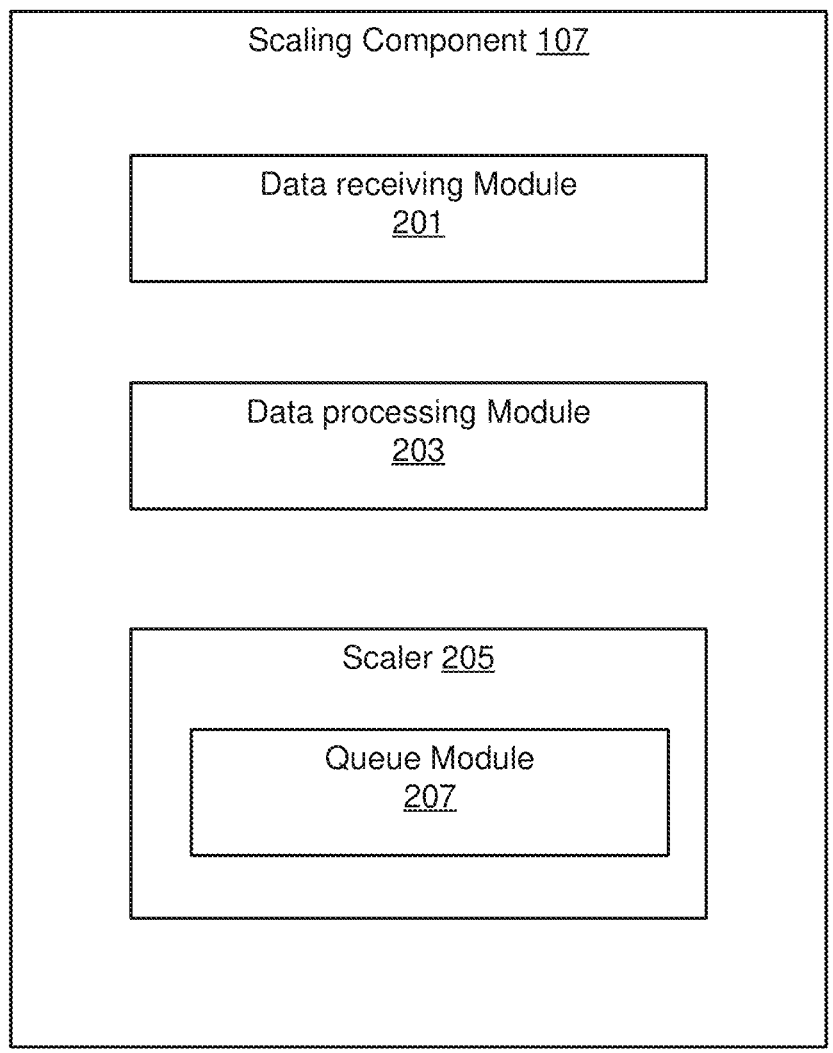
FIG. 2 is a block diagram of an example scaling component residing on a consumer server.

FIG. 2 is a block diagram of an example scaling component 107 residing on a consumer server 105. The scaling component 107 includes hardware and/or software logic for automatically adding or removing one or more consumer servers based on the data processing needs of the event aggregator 101. As a result, data transmission may be balanced among the event aggregator 101 and the event consumer 105 to achieve fast data processing.

The scaling component 107 may include a data receiving module 201, a data processing model 203, and a scaler 205. The data receiving module 201 allows an event consumer 105 to request and receive the events or data from the event aggregator 101. In one implementation, the data receiving module 201 may receive the events from the event aggregator 101 through event subscription. The data receiving module 201 may use a software development kit (SDK) provided by the event aggregator 101 to subscribe for events. For example, the data receiving module 201 may call an API to register the event consumer 105 for receiving events from the event aggregator 101, e.g., as shown in 153 of FIG. 1B. The data receiving module 201 may also set up a call back using the API to receive an event. In one implementation, an event or data may be pushed to the consumer server 105. The data receiving module 201 may receive a function call to know that an event is received and needs to be processed.

Once the data receiving module 201 sets up the event subscription and the event aggregator 101 receives the notification of the subscription from an event consumer 105, the data receiving module 201 of the corresponding event consumer 105 may receive the events forwarded by the event aggregator 101. For example, when the event aggregator 101 receives an event (e.g., a Microsoft Word login event through event help), the event aggregator 101 forwards and exposes the event to the data receiving module 201 of one or more event consumers 105 subscribed to receive the event. In one implementation, the data receiving module 201 may establish a communication connection with the event aggregator 101 to receive events from the event aggregator 101. For example, the data receiving module 201 may communicate with the event aggregator 101 to receive the events through a transmission control protocol (TCP) connection or a user datagram protocol (UDP) connection. In one implementation, the data receiving module 201 may receive the events pushed by the event aggregator 101 to the event consumer 105 through the communication connection. The event aggregator 101 may send the events as fast as the event consumer 105 can receive, process, and acknowledge the events.

Responsive to receiving the events from the event aggregator 101, the data processing module 203 may consume or process the events. For example, the data processing module 203 may analyze an event and report an analysis result about the event. Alternatively, the data processing module 203 may categorize the event and store the categorized event in a database. The data processing module 203 may process the events according to a pre-defined logic. The data receiving module 201 and data processing module 203 may be a portion of a service. The service may be built and deployed to a consumer server 105 to implement the event processing procedure.

Since the event aggregator 101 only sends the events as fast as the event consumer 105 can consume, the data processing module 203 of the event consumer 105 would always have the processing power to process one or more received events, e.g., according to the pre-defined logic. However, even if the data processing module 203 can process the currently received events, the event processing on the event consumer 105 may have already fallen behind, i.e., the data processing module 203 is processing an older received event while one or more newer events are stored in a buffer of the event aggregator 101 without being transmitted and received by the event consumer 105. In such a scenario, the stored events are unread and un-transmitted by the event aggregator 101 until (1) the data processing module 203 finishes processing the current event and requests for one or more stored events to be transmitted and/or (2) the buffer of the event aggregator 101 runs out and one or more stored events are replaced by the most recent events entering the buffer and get lost. In this case, the scaler 205 would intervene to determine whether a new configuration of the event consumers 105, e.g., adding more consumer server(s), is needed. In another example, the buffer of the event aggregator 101 may not include any events for a certain amount of time, which indicates that the processing speed of the event consumer 105 is higher than the incoming event rate from the event aggregator 101. As a result, the scaler 105 may also intervene to have one or more consumer servers removed.

The scaler 205, in communication with the data receiving module 201 and the data processing module 203, is responsible for autoscaling the event consumer or consumer servers 105. The event aggregator 101, similar to a web server, receives the events directly from the client devices 103. Therefore, the event aggregator 101 may dynamically adjust its cache, queue or the number of the aggregator servers for receiving the events based on the volume of events it receives from the client devices 103. In contrast, the event consumer 105 requests (e.g., via subscription) to receive the events from the event aggregator 101, instead of directly reacting to event calls from the client devices 103. Once the data receiving module 201 creates the data subscription, a network connection is established for the event consumer 105 to receive the events. This network connection, however, does not go through the same queues that the event aggregator 101 uses to serve the web requests from the client devices 103. Therefore, the event aggregator 101 may only send the event data as fast as the event consumer 105 can consume it. For example, if the event aggregator 101 is receiving events faster than the event consumer 105 can consume, the event consumer 105 will be more and more delayed until the point that the cache/buffers in the event aggregator 101 are exhausted and events are discarded by the event aggregator 101. This technical problem is solved by the technical solution described herein by (1) allowing the volume of data being processed by the event aggregator 101 to be dynamically detected and (2) allowing more or fewer servers to be allocated to the event consumer 105 to match the volume of data being processed by the event aggregator 101.

Figure 3:
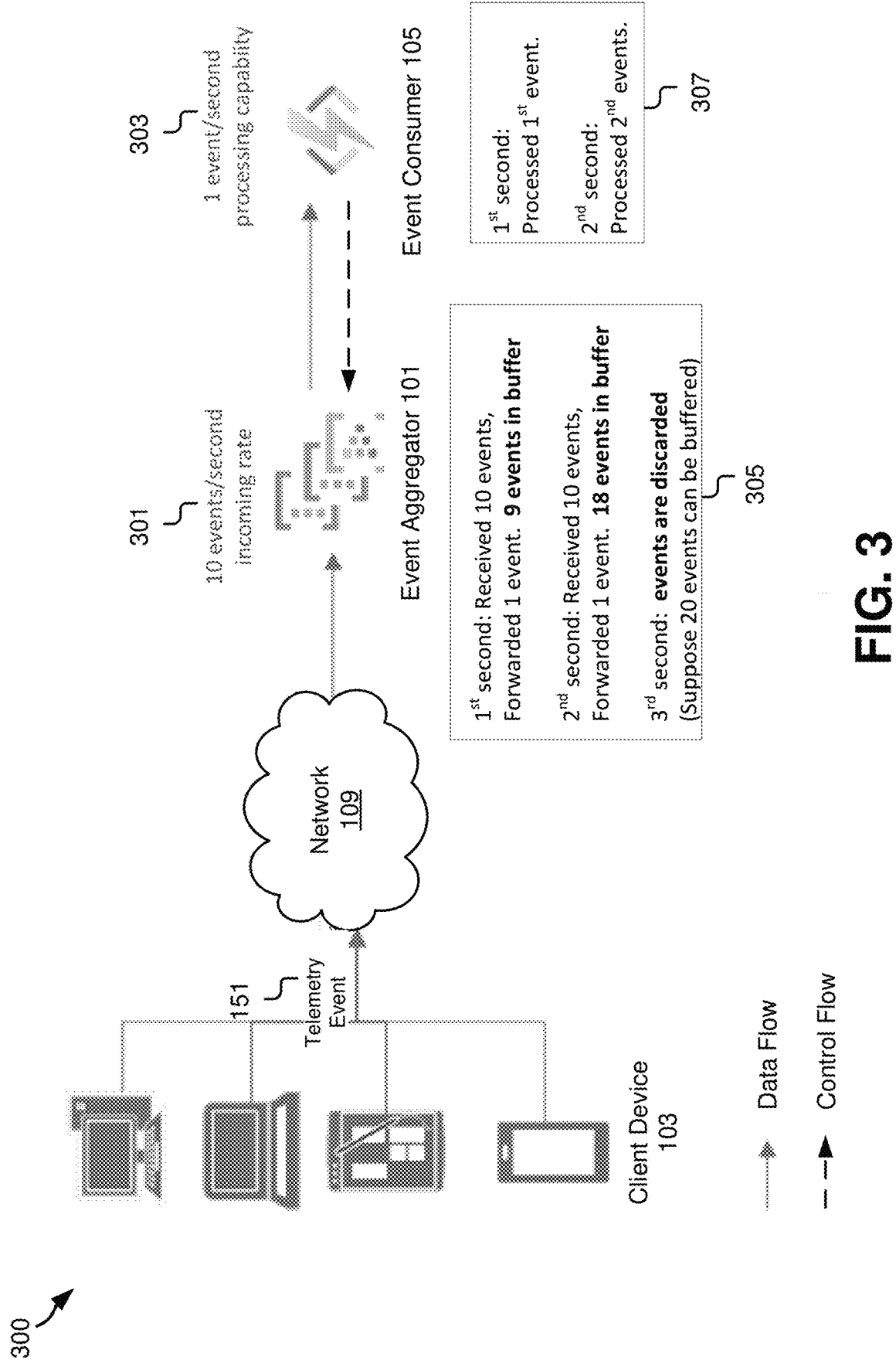
FIG. 3 is a block diagram of an example event processing flow that causes the autoscaling of the event consumer.

FIG. 3 is a block diagram of an example event processing flow 300 that causes the autoscaling of the event consumer 105. The scaling or reconfiguration of the event consumer 105 is desired when the event aggregator 101 starts receiving events faster than the event consumer 105 can process, or when the event consumer 105 is able to process more events than the event aggregator 101 can provide. The scaling of the event consumer 105 occurs during an ongoing event processing procedure. The scaling is dynamic because the event process demand from the event aggregator 101 and the client devices 103 varies at different times of the data processing. The scaling is automatic because no manual intervention is involved.

FIG. 3 illustrates a scenario of consumer-autoscaling where the event aggregator 101 receives events faster than the event consumer 105 can process. Assume that the event aggregator 101 receives 10 events per second as indicated by the incoming rate of 301, while the event consumer 105 can only process one event per second as indicated by the processing capability of 303. For simplicity, the incoming rate and the processing capability are fixed numbers in the example of FIG. 3, but they may vary over time in practice. Also, assume that the event aggregator 101 can store up to 20 events in its buffer. The event processing flow at the event aggregator 101 and the event consumer 105 are respectively described in 305 and 307. In the first second, the event aggregator 101 receives 10 events, but only sends one event to the event consumer 105 for processing since the event consumer 105 is capable of processing only one event every second. Therefore, at the first second, there are nine events left in the buffer of the event aggregator 101. In the next second, the event aggregator 101 receives another 10 events and sends another one event to the event consumer 105, which results in more events, i.e., 18 events, being left in the buffer of the event aggregator 101. Similarly, based on the incoming rate being 10 events/second and processing capability being 1 event/second, at the third second, there would should be 27 events left in the buffer of the event aggregator 101. However, since the buffer can only store 20 events, the event aggregator 101 must discard seven events after filling up the buffer. In one implementation, each event is associated with a timestamp or a sequential number indicating the order in which the event is transmitted. Based on the timestamp or the sequential number, the event aggregator 101 may discard the oldest events. However, no matter which seven events are discarded, these events include valid information and are never sent to the event consumer 105 for processing, thereby the performance of data processing is greatly impaired.

One way to easily fix this problem is to use 10 event consumers or consumer servers 105 to support the data transmission from the event aggregator 101. However, this is infeasible since the number of incoming events in practice is not static or predictable. The incoming events that vary during the day or grow over time may cause data loss or read delays when a static capacity assignment strategy is used.

An alternative way to balance the event transmission between the event aggregator 101 and the event consumer 105 and prevent valid information/event(s) from being lost is to scale the configuration of the event consumer or consumer servers 105 dynamically and automatically. One auto-scale strategy is based on machine performance counters or metrics such as CPU, memory, disk utilization. These metrics at most describe the state of a processing server rather than effectively reflecting the data or event throughput. The data/event throughput is not only limited by the state of the processing server, but also determined by external factors such as network bandwidth, speed, etc. It is very likely that a consumer server 105, which has no performance measures reaching a high level of utilization, is still not being able to process the event throughput received by the event aggregator 101. Another auto-scale strategy is based on tracking of the incoming request queue. The event aggregator 101 communicates with the client devices 103 to handle event requests. This is an advanced approach since it takes into consideration both the event throughput and the servers' processing capabilities. However, for the event consumer 105, the event data may be received through a TCP or UDP connection and not go through the request processing stack on the event aggregator or aggregator server 101. The scaler 205 communicates with other components of the consumer server 105 to solve this technical problem.

Referring back to FIG. 2, the scaler 205 allows the event consumer 105 to auto-scale according to the arrival event rate on the event aggregator 101. In one implementation, the scaler 205 may request the event aggregator 101 to send to the event consumer 105 additional information about the number of events available on the event aggregator 101. Therefore, when receiving the $N^{th}$ event from the event aggregator 101, where N is an integer greater than one, the scaler 205 would also receive the number of the latest event available on the aggregator server 101 through the data receiving module 201. For example, a number 100 may be associated with the $N^{th}$ event to indicate that there are 100 remaining events to be sent and processed by the event consumer 105. The number of available events varies at different times. The number of the latest available event indicates a number of events still available on the aggregator server 101 when an event is being sent from the aggregator server 101 to the consumer server 105. This number allows the scaler 205 to know how many events are left to be read from the event aggregator 101, e.g., how far the event consumer 105 may fall behind or outpace the event transmission of the event aggregator 101. Depending on the value of this number, the scaler 205 may determine whether to add or remove consumer server(s), how many consumer servers should be added or removed, etc. In one implementation, the scaler 205 may signal a load balancing mechanism or server to allocate the determined number of servers. It should be noted that although the scaler 205 is included in an event consumer 105 as depicted in FIG. 2, in another implementation, the scaler 205 may reside on a separate load balancing server and serve as an auto-scaling controller to determine a new configuration for the event consumer and allocate the event consumers according to the new configuration.

In one implementation, the scaler 205 includes a queue module 207. The queue module 207 maintains a queue and shares the queue with every consumer server 105. Responsive to receiving information about the latest event available on the event aggregator 101 together with each event sent to the event consumer 105, the queue module 207 may determine there is at least one work item. A work item is an event in the buffer of the event aggregator 101 waiting to be transmitted and processed. From the perspective of the consumer server 105, a work item is an event waiting to be received and read. The queue module 207 of one event consumer (e.g., consumer server 105a) may place the work item in a shared queue such that any other event consumers (e.g., consumer server 105b) may recognize that there is at least one event available on the event aggregator 101 that needs to be sent and processed. The queue provides a direct hint to the scaling. As the queue grows, it indicates a need for adding more consumer servers. If the queue becomes idle for a long period of time, it indicates that one or more consumer servers may need to be removed. In another implementation, instead of a queue module on the consumer server maintaining the queue, the event aggregator 101 may create, maintain, and share the queue with the deployed consumer servers in the data processing system 100.

The event consumer(s) 105 wait to receive and process the queued work item(s). Once a work item arrives, one of the event consumer server(s) 105 may process the work item, and the queue model 207 of this consumer server 105 may remove the work item from the shared queue. The queue load is therefore modified. The scaler 205 may detect the growth and shrinkage of the queues and use such information to control the number of servers to be allocated.

In one implementation, if the number/quantity of work items in the shared queue satisfies or exceeds a threshold number, the scaler 205 may determine under-provision on the event consumer side and thus add more consumer server(s) 105. The scaler 205 may specify the threshold number based on a buffer size of the event aggregator 101. The scaler 205 may also specify different levels of thresholds, and determine the number of consumer servers to be added based on which level of the threshold the number of work items in the shared queue satisfies. In another implementation, if the number of work items in the shared queue does not satisfy a pre-defined threshold, e.g., is below the threshold, the scaler 205 may determine over-provision on the event consumer side and thus remove some consumer servers 105. The scaler 205 may also specify different levels of thresholds, and determine the number of consumer servers to be removed based on which level of the threshold the number of work items in the shared queue does not satisfy. In one implementation, the scaler 205 may also remove the consumer server(s) based on the number of work items in the shared queue not satisfying the pre-defined threshold for over a threshold amount of time.

Figure 4:
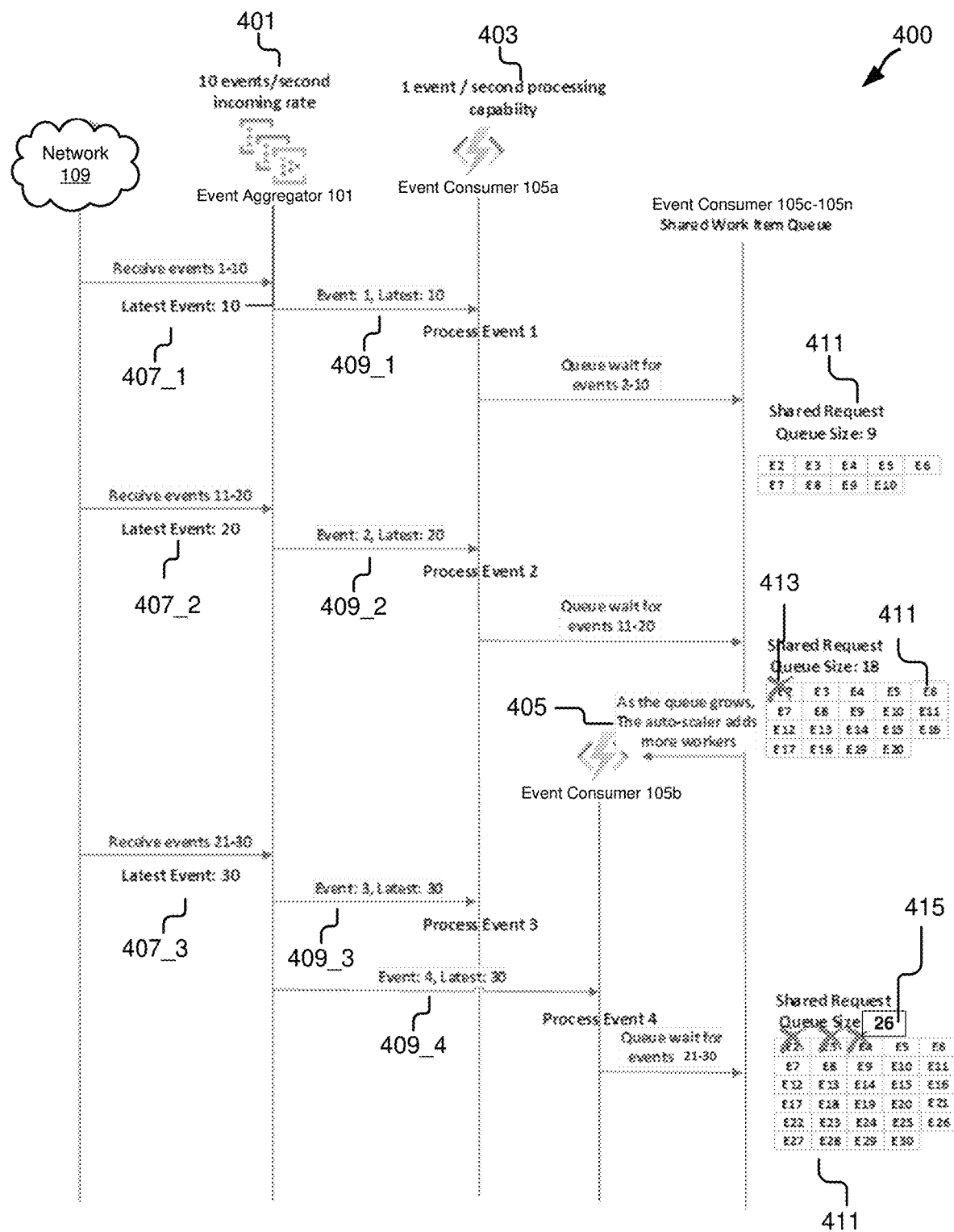
FIG. 4 is a block diagram of an example event processing flow for scaling up the event consumer servers.

FIG. 4 is a block diagram of an example event processing flow 400 for scaling up event consumer servers. In the example depicted, the incoming data rate 401 at the event aggregator 101 is 10 events/second and the processing capability 403 at the event consumer 105a (i.e., the first consumer server) is 1 event/second, which indicates an under-provision situation where a single event consumer 105a cannot meet the data processing demand of the event aggregator 101. As a result, the event consumer 105b is added as the second consumer server at 405 to work together with the event consumer 105a to support the event processing need of the event aggregator 101.

As depicted, events arrive in the event aggregator 101 at 407_1, 407_2, and 407_3. The event aggregator 101 then forwards each of the received events respectively to the event consumer 105a at 409_1, 409_2, and 409_3. In forwarding the events to the event consumer 105a through the data receiving module 201 at 409_1, 409_2, and 409_3, the event aggregator 101 not only indicates the event number associated with each event (e.g., event 1, event 2), but also transmits information about and the latest events available on the event aggregator 101. The event number is determined based on the timestamp or sequential number associated with each event. For example, when event 1 is being sent to the event consumer 105a, there are 10 events available on the event aggregator 101. When event 2 is being sent to the event consumer 105a, there are 20 events available on the event aggregator 101. The event consumer 105a uses the data processing module 203 to process every event transmitted by the event aggregator 101.

In one implementation, the queue module 207 included in the scaler 205 of the event consumer 105a may queue one or more work items that await being received and read. If the number of work items in the queue increases, the scaler 205 of the event consumer 105a may determine one or more new servers are needed to help handle the load in the queue and communicate to a load balancing server (not shown) to allocate the determined number of new servers. For example, when the event consumer 105a receives event 1 at 409_1 and processes event 1, there are nine work items or waiting events in queue 411. When the event consumer 105a receives event 2 in 409_2 and processes event 2, the number of work items or awaiting events in queue 411 increases to 18. This number is calculated because the number of events available on the event aggregator 101 is 20 when event 2 is being processed, and event 2 is processed and thus removed from queue 411 as indicated by the crossing label 413. Suppose the buffer size of the event aggregator 101 is 20 events. The load of the queue, 18 events, indicates that these events can still be safely stored in the buffer of the event aggregator 101 and wait to be transmitted. Therefore, the automatic scaling mechanism is not activated, and the data processing flow moves to event 3.

When the number of events in the queue 411 continues to increase, automatic scaling may be activated to add more servers to accommodate the increased volume. As depicted, when the event consumer 105a receives event 3 in 409_3 and processes event 3, the latest available event number becomes 30 because the incoming event rate at the event aggregator 101 is 10 events/second. Even if the consumer server 105*a* can process event 3, there are still 27 events waiting to be transmitted to consumer server 105*a*. The queue 411 is overloaded because the buffer of the event aggregator 101 can only keep 20 events. The queue discards the events for which there are no consumers. Therefore, some of the 27 events (e.g., old events such as E4, E5, E6, etc.) in the queue 411 will be dropped. To prevent or at least mitigating the event loss, a new event consumer 105*b* is added in 405. Consequently, the event aggregator 101 transmits event 4 and associated latest available event number 30 to the newly added event consumer 105*b*. With processing of event 3 by the event consumer 105*a* and the processing of event 4 by the event consumer 105*b*, both events are removed from the queue 411. That leaves the total number of events in the queue at 26 as indicated by 415. In other words, when the new servers are added or allocated, the data throughput handled by a server array, e.g., the consumer servers 105*a* and 105*b*, increases because the queue size is decreased from 27 to 26. The autoscaling of the event consumer repeats until an equilibrium state is reached. Although not shown in FIG. 4, the consumer servers may also be reduced or scaled-down when the volume of the data processing decreases.

It should be noted that the information about the latest event that arrives and the latest events available to be read are shared amongst all event consumers 105. In one implementation, the queue module 207 may share the queue 411 among event consumers. For example, at 409_3, the event consumer 105*a* shares the information about event 3 and the latest available event number 30 with the second event consumer 105*b* such that the event consumer 105*b* may be able to identify the event to be worked on, e.g., processing event 4. In other words, the shared information allows a work item to be processed by an event consumer that is not necessarily the consumer that is going to receive the event. This is particularly advantageous for streamlining the data processing among multiple event consumers. In one implementation, the information about the latest event that arrives and the latest events available to be read are stored in a data store, and the data store is configured to be accessible by the event consumers 105. Therefore, when such information becomes available in the data store, the consumer servers may read and write the information. In one implementation, the reads and writes to the data store are not synchronized. In some cases, more than one consumer server may be registered for the same event. A race condition is possible, that is, when a consumer is busying in processing one event, another consumer having registered for the same event may receive an incoming event. By removing the transactional requirement between consumers, the data processing performance may be improved.

In one implementation, when sending the data/events to consumer(s), the event aggregator 101 may split the events received from client devices 103 into separate partitions. By using the partition, consumers can properly receive and read events in sequence, and each event is received and processed by only one event consumer. In such a scenario, the scaler 205 may track the latest available events per partition rather than a total number of available events on the event aggregator 101.

Although FIG. 4 shows that work items are added to the queue every second, in reality, the queue module 205 may group events and create work items that represent a wait for 100s or 1000s of events, for example. The number of events that are bunched in a single wait can also be defined dynamically depending on the incoming rate of events.

Figure 5:
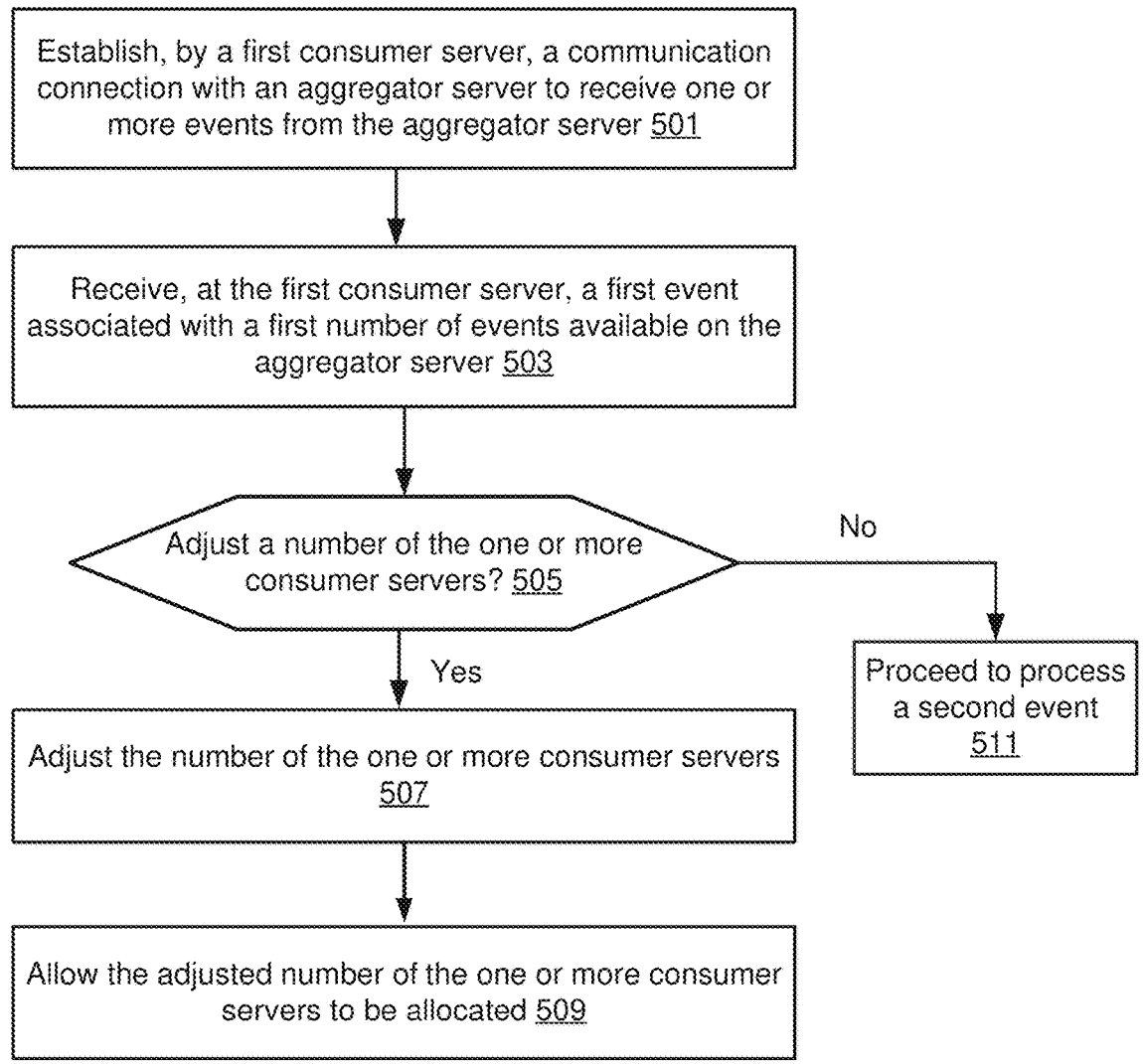
FIG. 5 is a flowchart of an example method for automatically adjusting a number of consumer servers to accommodate data processing needs.

FIG. 5 is a flowchart of an example method 500 for automatically adjusting a number of consumer servers used to accommodate data processing needs. The method may be implemented by a scaling component 107 of a first consumer server 105*a* communicating with the aggregator server 101 and client devices 103*a*-103*n*. At block 501, the scaling component 107 of the first consumer server establishes a communication connection with an aggregator server 101 to receive one or more events from the aggregator server 101. The first consumer server 105*a* is one of one or more consumer servers 105*a*-105*n*. The aggregator server 101 sends multiple events including the one or more events to the one or more consumer servers 105*a*-105*n* for processing. The communication connection is at least one of a transmission control protocol (TCP) connection or a user datagram protocol (UDP) connection. In one implementation, the first consumer server, e.g., 105*a*, may subscribe to the aggregator server to receive the one or more events.

At block 503, the scaling component 107 of the first consumer server 105*a* may receive a first event associated with a first number of events available on the aggregator server 101. For example, when event 1 is being sent to the event consumer 105*a*, the number 10 of events available on the event aggregator 101 may be received along with event 1. When event 2 is being sent to the event consumer 105*a*, the 20 events available on the event aggregator 101 may also be sent. In one implementation, the scaling component 107 of the first consumer server 105*a* may transmit a request to the aggregator server 101 to provide a number of events available on the aggregator server 101 when sending one of the one or more events to the first consumer server 105*a*.

At block 505, it is determined whether to adjust a number of the one or more consumer servers 105*a*-105*n* based on the first number of events available on the aggregator server 101. Continuing with the above example, the number 20 indicates the events available on the event aggregator 101 when event 2 is being received at the event consumer 105*a*. If the number 20 is over a threshold determined based on a buffer size of the event aggregator 101, it is determined that a new consumer server 105*b* should be added to the data processing system 100. However, if this number is close to zero, it may indicate that the current configuration of the consumer servers is above the data processing need, and thus an existing consumer server of the one or more consumer servers 105 may be removed. In other words, in response to determining to adjust the number of the one or more consumer servers based on the first number of events available on the aggregator server 101, the scaling component 107 of the first consumer server 105*a* may adjust the number of the one or more consumer servers at block 507 and allow the adjusted number of the one or more consumer servers to be allocated at block 509. For example, the scaling component 107 may communicate with a load balancing server to deploy the reconfigured number of the one or more consumer servers in the data processing system 100.

In response to determining not to adjust the number of the one or more consumer servers based on the first number of events available on the aggregator server 101, however, the scaling component 107 of the first consumer server 105*a* may proceed to process the next or second event at block 511. For example, the scaling component 107 of the first consumer server may receive a second event associated with a second number of events available on the aggregator server 101 and determine whether to adjust the number of the one or more consumer servers based on the second number of events available on the aggregator server 101. The second number is different from the first number.

Figure 6:
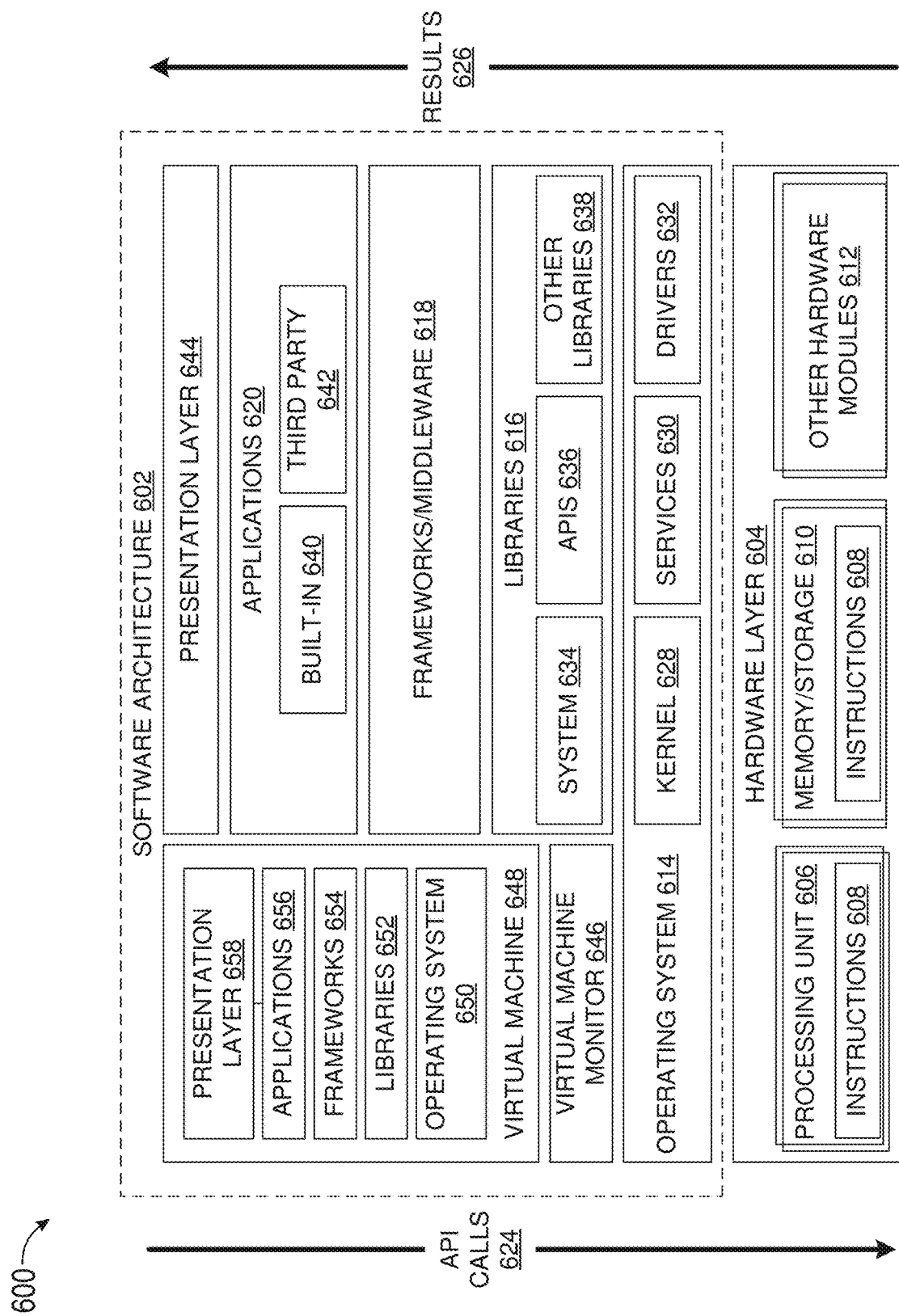
FIG. 6 is a block diagram illustrating an example software architecture.

FIG. 6 is a block diagram 600 illustrating an example software architecture 602, various portions of which may be used in conjunction with various hardware architectures herein described, which may implement any of the above-described features. FIG. 6 is a non-limiting example of software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
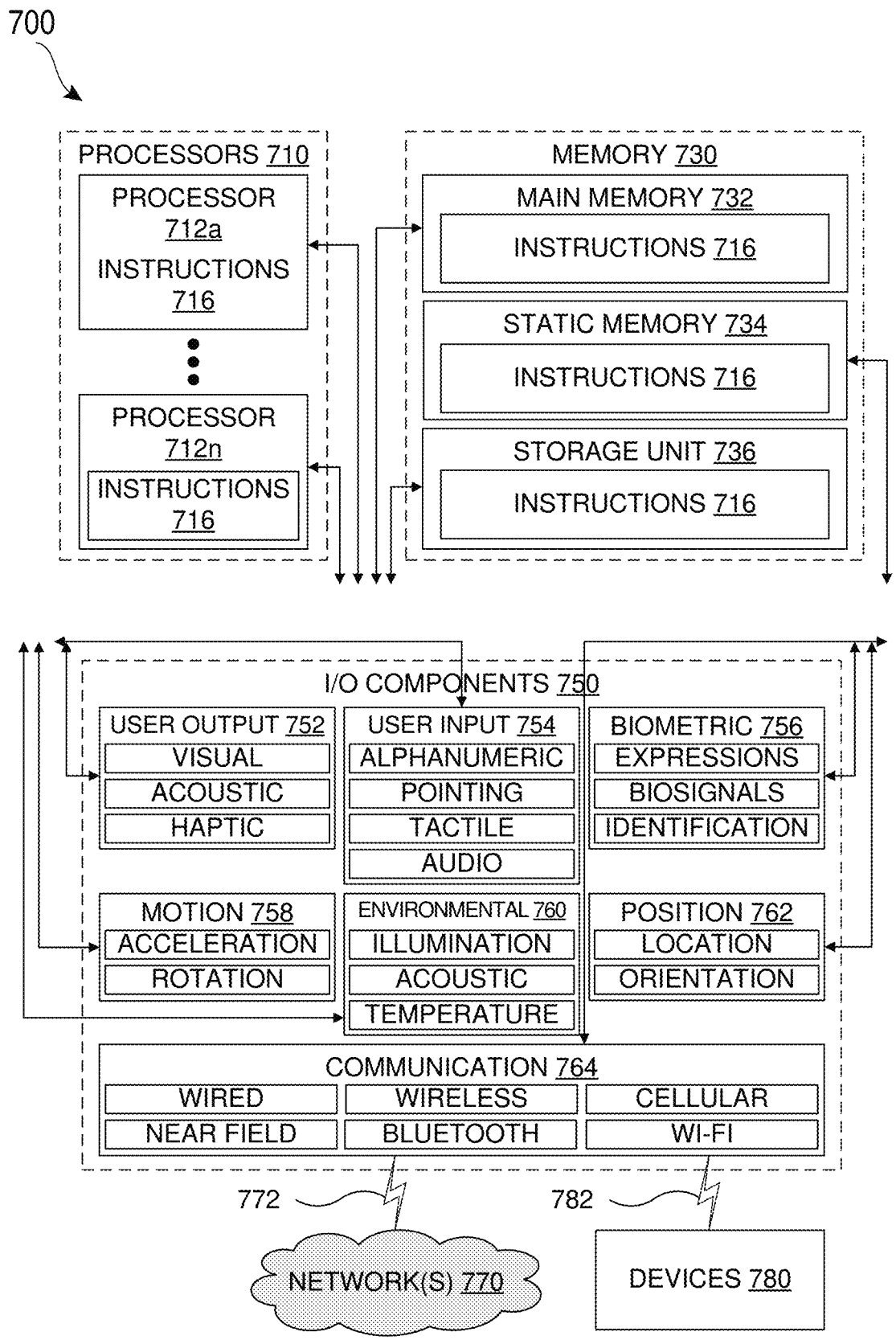
FIG. 7 is a block diagram illustrating components of an example machine configured to read instructions from a machine-readable medium.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 772, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing system for automatically scaling consumer servers comprising:
   a processor; and
   a memory, coupled to the processor, storing executable instructions that, when executed by the processor, cause the data processing system to:
   establish, by a first consumer server, a communication connection with an aggregator server to receive one or more events from the aggregator server, wherein the first consumer server is one of one or more consumer servers, and the aggregator server sends a plurality of events including the one or more events to the one or more consumer servers for processing;
   receive, at the first consumer server, a first event associated with a first number of events available on the aggregator server;
   determine whether to adjust a number of the one or more consumer servers based on the first number of events available on the aggregator server;
   in response to determining to adjust the number of the one or more consumer servers based on the first number of events available on the aggregator server, adjust the number of the one or more consumer servers and allow the adjusted number of the one or more consumer servers to be allocated;
   determine processing capability of the first consumer server when receiving the first event, the processing capability including a quantity of events that the first consumer server can process within a unit of time;
   create a queue of events based at least one on the processing capability; and
   determine whether a quantity of events in the created queue satisfies a threshold number;
   wherein determining whether to adjust the number of the one or more consumer servers is based on whether the quantity of events in the created queue satisfies the threshold number.

2. The system of claim 1, wherein, to determine whether to adjust the number of the one or more consumer servers, the executable instructions further include instructions that, when executed by the processor, cause the data processing system to:
in response to determining not to adjust the number of the one or more consumer servers based on the first number of events available on the aggregator server:
receive, at the first consumer server, a second event associated with a second number of events available on the aggregator server, wherein the second number is different from the first number; and
determine whether to adjust the number of the one or more consumer servers based on the second number of events available on the aggregator server.

3. The system of claim 1, wherein the executable instructions further include instructions that, when executed by the processor, cause the data processing system to:
determine that the quantity of events in the created queue fails to satisfy the threshold number for at least a threshold amount of time; and
remove at least one of the one or more consumer servers based on determining that the quantity of events in the created queue fails to satisfy the threshold number for at least the threshold amount of time.

4. The system of claim 1, wherein the executable instructions further include instructions that, when executed by the processor, cause the data processing system to specify the threshold number based on a buffer size of the aggregator server.

5. The system of claim 1, wherein the executable instructions further include instructions that, when executed by the processor, cause the data processing system to share the queue with other servers of the one or more consumer servers.

6. The system of claim 1, wherein to adjust the number of the one or more consumer servers, the executable instructions further include instructions that, when executed by the processor, cause the data processing system to:
add a new consumer server; or
remove one of the one or more consumer servers.

7. The system of claim 1, wherein to establish, by the first consumer server, the communication connection with the aggregator server, the executable instructions further include instructions that, when executed by the processor, cause the data processing system to subscribe, by the first consumer server, to the aggregator server to receive the one or more events,
wherein the communication connection is at least one of a transmission control protocol (TCP) connection or a user datagram protocol (UDP) connection.

8. The system of claim 7, wherein to subscribe, by the first consumer server, to the aggregator server, the executable instructions further include instructions that, when executed by the processor, cause the data processing system to:
provide, by the aggregator server, an application programming interface (API);
call, by the first consumer server, the API to register the first consumer server; and
create, by the first consumer server, a call back to receive the one or more events using the API.

9. The system of claim 1, wherein the executable instructions further include instructions that, when executed by the processor, cause the data processing system to receive, by the aggregator server the plurality of events from a plurality of client devices.

10. The system of claim 1, wherein each event is associated with a timestamp or a sequential number.

11. A method for automatically scaling consumer servers comprising:
establishing, by a first consumer server, a communication connection with an aggregator server to receive one or more events from the aggregator server, wherein the first consumer server is one of one or more consumer servers, and the aggregator server sends a plurality of events including the one or more events to the one or more consumer servers for processing;
receiving, at the first consumer server, a first event associated with a first number of events available on the aggregator server;
determining whether to adjust a number of the one or more consumer servers based on the first number of events available on the aggregator server;
in response to determining to adjust the number of the one or more consumer servers based on the first number of events available on the aggregator server, adjusting the number of the one or more consumer servers and allowing the adjusted number of the one or more consumer servers to be allocated;
determining processing capability of the first consumer server when receiving the first event, the processing capability including a quantity of events that the first consumer server can process within a unit of time;
creating a queue of events based at least one on the processing capability; and
determining whether a quantity of events in the created queue satisfies a threshold number;
wherein determining whether to adjust the number of the one or more consumer servers is based on whether the quantity of events in the created queue satisfies the threshold number.

12. The method of claim 11, wherein to determine whether to adjust the number of the one or more consumer servers, the method further comprises:
in response to determining not to adjust the number of the one or more consumer servers based on the first number of events available on the aggregator server:
receiving, at the first consumer server, a second event associated with a second number of events available on the aggregator server, wherein the second number is different from the first number; and
determining whether to adjust the number of the one or more consumer servers based on the second number of events available on the aggregator server.

13. The method of claim 11, further comprising:
determining that the quantity of events in the created queue fails to satisfy the threshold number for at least a threshold amount of time; and
removing at least one of the one or more consumer servers based on determining that the quantity of events in the created queue fails to satisfy the threshold number for at least the threshold amount of time.

14. The method of claim 11, further comprising specifying the threshold number based on a buffer size of the aggregator server.

15. The method of claim 11, further comprising sharing the queue with other servers of the one or more consumer servers.

16. The method of claim 11, wherein to adjust the number of the one or more consumer servers, the method comprises:

adding a new consumer server; or removing one of the one or more consumer servers.

17. The method of claim 11, further comprising subscribing, by the first consumer server, to the aggregator server to receive the one or more events, wherein the communication connection is at least one of a transmission control protocol (TCP) connection or a user datagram protocol (UDP) connection.

18. The method of claim 17, wherein to subscribe, by the first consumer server, to the aggregator server, the method comprises:

providing, by the aggregator server, an application programming interface (API);

calling, by the first consumer server, the API to register the first consumer server; and creating, by the first consumer server, a call back to receive the one or more events using the API.

* * * * *